United States Patent [19]
Eberwein

[11] Patent Number: 6,102,363
[45] Date of Patent: Aug. 15, 2000

[54] ACTUATOR FOR RECIPROCATING AIR DRIVEN DEVICES

[75] Inventor: Dennis D. Eberwein, Riverside, Calif.

[73] Assignee: Wilden Pump & Engineering Co., Colton, Calif.

[21] Appl. No.: 09/063,253

[22] Filed: Apr. 20, 1998

[51] Int. Cl.[7] .................................................. F16K 31/143
[52] U.S. Cl. .............................................. 251/63; 251/31
[58] Field of Search ............................. 251/63, 31, 900

[56] References Cited

U.S. PATENT DOCUMENTS

| | | | |
|---|---|---|---|
| D. 275,858 | 10/1984 | Wilden | D15/7 |
| D. 294,946 | 3/1988 | Wilden | D15/7 |
| D. 294,947 | 3/1988 | Wilden | D15/7 |
| 3,159,378 | 12/1964 | Haag | 251/63 |
| 3,713,458 | 1/1973 | Lee | 251/63 |
| 4,234,162 | 11/1980 | Kay | 251/175 |
| 4,242,941 | 1/1981 | Wilden | 91/319 |
| 4,247,264 | 1/1981 | Wilden | 417/393 |
| 4,256,141 | 3/1981 | Peters | 251/63 |
| 4,549,467 | 10/1985 | Wilden et al. | 91/307 |
| 4,580,602 | 4/1986 | Boody | 251/63 |
| 4,651,764 | 3/1987 | Miller et al. | 251/63 |
| 4,830,331 | 5/1989 | Vindum | 251/63 |
| 5,169,296 | 12/1992 | Wilden | 417/395 |
| 5,213,485 | 5/1993 | Wilden | 417/393 |
| 5,435,336 | 7/1995 | Serot | 251/63 |

*Primary Examiner*—Gregory L. Huson
*Assistant Examiner*—Joanne Y. Kim
*Attorney, Agent, or Firm*—Lyon & Lyon LLP

[57] ABSTRACT

An actuator valve for an air driven reciprocating device including a housing with a cylinder having a sliding valve piston located therein. The valve piston includes circumferential grooves near the ends of the piston to receive floating piston rings. The piston rings exhibit a positive clearance with the cylinder which allows axial airflow thereby. The housing provides an inlet extending into one side of the cylinder and passageways diametrically opposed extending from the cylinder. Controlled passageways at the ends of the cylinder alternately vent. Between venting, the cylinder accumulates pressure at both ends of the piston. With venting, the pressurized air at the unvented end of the piston shifts the piston toward the vented end. Bleed passageways extend from adjacent the inlet to the ends of the piston to assist shifting once the piston proceeds over center.

9 Claims, 1 Drawing Sheet

ACTUATOR FOR RECIPROCATING AIR DRIVEN DEVICES

BACKGROUND OF THE INVENTION

The field of the present invention is reciprocating air driven devices and the actuators therefor.

Pumps having double diaphragms driven by compressed air directed through an actuator valve are well known. Reference is made to U.S. Pat. Nos. 5,213,485; 5,169,296; and 4,247,264; and to U.S. Pat. Nos. Des. 294,946; 294,947; and 275,858. Actuator valves using a feedback control system are disclosed in U.S. Pat. Nos. 4,242,941 and 4,549,467. The disclosures of the foregoing patents are incorporated herein by reference.

Common to the aforementioned patents on air driven diaphragm pumps is the disclosure of two opposed pumping cavities. The pumping cavities each include a pump chamber housing, an air chamber housing and a diaphragm extending fully across the pumping cavity defined by these two housings. Each pump chamber housing includes an inlet check valve and an outlet check valve. A common shaft typically extends into each air chamber housing to attach to the diaphragms therein.

An actuator valve receives a supply of pressurized air and operates through a feedback control system to alternately pressurize and vent the air chamber side of each pumping cavity through a valve piston. Feedback to the valve piston is typically provided by the position of the shaft attached to the diaphragms which includes valves that alternately vent the ends of the valve cylinder within which the valve piston reciprocates.

The valve piston in such actuators is understood to shift by the selective venting of one end of the enclosing cylinder in which the piston moves. By selectively venting one end or the other of the cylinder, the energy stored in the form of compressed air at the unvented end of the cylinder acts to drive the piston to the alternate end of its stroke. The pressure builds up at both ends of the valve piston between strokes. Pressurized air is allowed to pass longitudinally along the piston within the cylinder to the ends of the piston. Consequently, a clearance has typically been provided between the valve piston and the cylinder.

Under proper conditions, the shifting energy is more than sufficient to insure a complete piston stroke. However, under adverse conditions, the damping or resistance to movement of the piston may so increase that the system may require all available potential energy for shifting of the piston. Under such marginal conditions, all possible energy is advantageously applied to insure operation of the actuator valve.

One mechanism for providing additional energy for shifting is presently included in the devices of the aforementioned patents. Additional compressed air is supplied through passageways to the expanding chamber at one end of the valve piston. The air is gated into the passageways by the location of the piston.

Controlling the clearance between the valve piston and the valve cylinder is also important to maintain sufficient energy. If the clearance becomes too large, excessive blow-by around the piston wastes the energy built up for the shift. With continued shifting, the valve piston wears in the cylinder and builds up excessive clearance. This effect is exacerbated by the pressure forces within the cylinder. There is a differential pressure diametrically across the valve piston between the inlet and the air and exhaust passages on the other side which forces the valve piston against the cylinder. To provide longevity to the actuator, the valve piston has typically been of anodized aluminum and the valve cylinders have typically been made of brass, often lubricated. Polymer materials, which offer advantages in cost of fabrication and not requiring lubrication, have typically exhibited excessive wear when used instead.

SUMMARY OF THE INVENTION

The present invention is directed to an actuator valve for a reciprocating air driven device. The actuator valve includes a piston with piston rings in circumferential grooves adjacent the ends of the piston. The piston rings provide a controlled clearance that is somewhat independent of the wear induced in the valve piston.

In a first separate aspect of the present invention, the piston rings are larger in axial profile than the valve piston. This defines the clearance between the piston and the cylinder, which controls axial flow around the piston within the cylinder.

In a second separate aspect of the present invention, the piston rings are floating in the grooves in the valve piston. This allows independent wear of the piston rings from the valve piston.

In a third separate aspect of the present invention, a combination of the prior separate aspects is contemplated.

Accordingly, it is an object of the present invention to provide an improved reciprocal air actuator valve. Other and further objects and advantages will appear hereinafter.

DETAILED DESCRIPTION OF THE PREFERRED EMBODIMENTS

Figure 1:
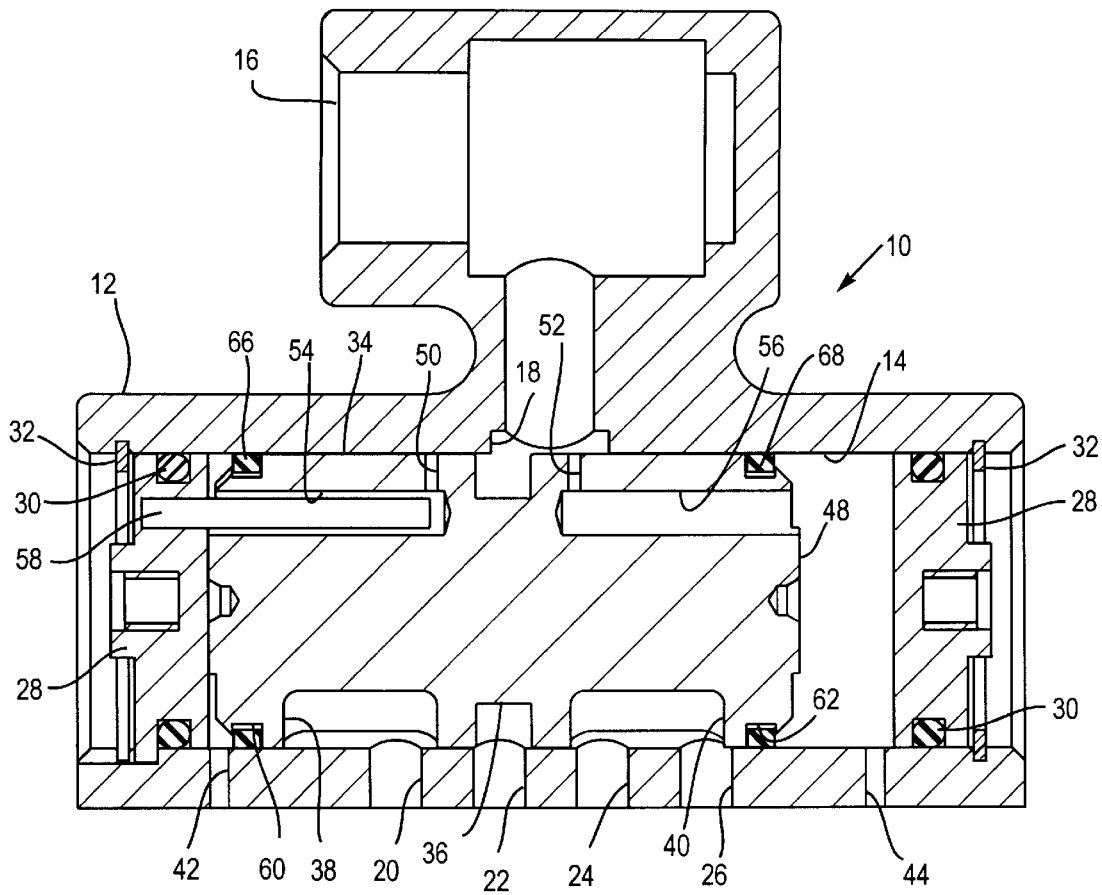
FIG. 1 is a cross-sectional side view of an actuator valve for an air driven reciprocating device.
Figure 2:
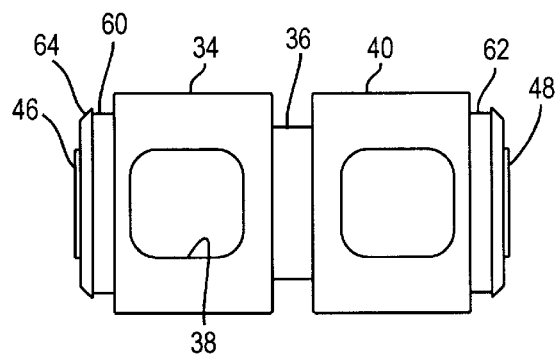
FIG. 2 is a bottom view of the valve piston of the actuator valve of FIG. 1.
Figure 3:
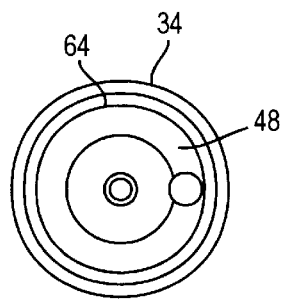
FIG. 3 is an end view of the valve piston of FIG. 2.
Figure 4:
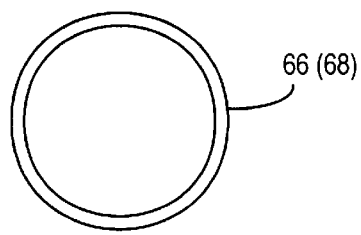
FIG. 4 is a plan view of a piston ring of the actuator valve of FIG. 1.
Figure 5:
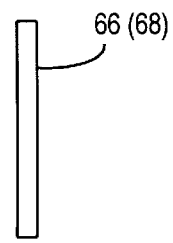
FIG. 5 is a side view of the piston ring of FIG. 4.

Turning in detail to the drawings, an actuator valve is illustrated in cross section in FIG. 1. The actuator valve 10 includes a housing 12 defining a cylinder 14. The housing includes an inlet passage 16 with means for coupling with a source of pressurized air. An inlet port 18 extends from the inlet passage 16 into the cylinder 14. A series of passageways 20 through 26 extend from the cylinder 14 through the wall of the housing 12 in a position diametrically opposed to the inlet port 18. The passageways 20 and 26 lead to exhaust while the passageways 22 and 24 lead to opposite sides of a diaphragm or piston mechanism. The passageways 20 through 26 provide alternate pressurizing and venting to the opposite sides of the reciprocating device.

The cylinder 14 is closed at the ends by end caps 28. The end caps 28 each include an annular groove for receipt of a sealing O-ring 30. Circular spring clips 32, each held within an inner groove in the wall of the cylinder 14, retain the end caps 28 in place.

A valve piston 34 is located within the cylinder 14 and allowed to reciprocate back and forth within the cylinder. The valve piston 34 has an annular groove 36 which is centrally mounted about the valve piston 34. This annular groove 36 cooperates with the inlet port 18 to convey pressurized air supplied through the inlet passage 16 around the valve piston 34 to one or the other of the passageways 22 and 24 for delivery to an air driven reciprocating device. Cavities 38 and 40 are cut into the bottom of the valve piston 34. These cavities 38 and 40 are positioned over the passageways 20 through 26 so as to provide controlled communication between the passageway 20 and the passageway 22 and also between the passageway 24 and the passageway 26. As can be seen in FIG. 1, the cavity 40 is providing communication between the passageways 24 and 26. This allows venting of one side of the reciprocating device. With the valve piston 34 in the same position, the annular groove 36 is in communication with the passageway 22 to power the other side of the reciprocating device. The opposite configuration is provided with the valve piston 34 at the other end of its stroke.

To control the valve piston 34, controlled passages 42 and 44 are positioned at either end of the cylinder 14. These passages 42 and 44 extend to cooperate with a shaft or other mechanism providing feedback from the movement of the reciprocating device. To shift the valve piston 34, one or the other of the passages 42 and 44 is vented to atmosphere. In between shifts, pressure is allowed to accumulate within the entire cylinder 14, with one end vented, the accumulated pressure at the other end shifts the piston. To increase energy for shifting, bosses 46 and 48 are provided at the ends of the valve piston 34. Thus, an area is provided for the accumulation of pressurized air even with the valve piston 34 hard against the most adjacent end cap 28.

To increase the shifting capability of the valve piston, radial holes 50 and 52 extend into the piston 34. The radial holes communicate with axial passageways 54 and 56 which extend to the ends of the valve piston 34. The radial holes 50 and 52 are spaced to be slightly wider than the inlet port 18. Thus, once the piston reaches a midpoint in its stroke, the hole most advantageously conveying additional pressure to the expanding end of the cylinder 14 is uncovered and contributes further to the shift. A pin 58 extends into one of the axial passageways 54 and 56 so as to orient the valve piston 34 angularly within the cylinder 18.

To insure that enough energy for the valve piston 34 to shift is accumulated prior to each successive shift, the positive clearance present between the periphery of the valve piston 34 and the cylinder wall 14 must be controlled. Excessive clearance allows the pressurized air accumulated behind the end of the piston to escape without transferring sufficient energy to the piston itself.

Because of the differential pressure across the cylinder 14 from the inlet 18 to the passageways 20 through 26 and the repeated back-and-forth action of the valve piston 34 in the cylinder 14, wear occurs on the lower side of the piston 34. Consequently, positive clearance continues to accumulate with operation of the actuator. With enough wear, the valve piston 34 must be replaced.

The valve piston 34 includes circumferential grooves 60 and 62 located adjacent the ends of the valve piston 34. A beveled section 64 extends outwardly from one end of each of the grooves 60 and 62. Piston rings 66 and 68 are positioned within the circumferential grooves 60 and 62. The piston rings 66 and 68 are positioned by forcing the resilient rings over the beveled sections 64 at the ends of the valve piston 34 so as to enter the circumferential grooves 60 and 62. The piston rings float within the grooves in that their inner peripheral diameter is larger than the outer diameter of the bottom of the grooves. The piston rings 66 and 68 are also preferably a bit thinner than the grooves 60 and 62 to enhance the floating characteristic. The cylinder 14, the valve piston 34 and the piston rings 66 and 68 are preferably circular in cross section. The outer profile of each of the piston rings 66 and 68 is slightly larger than that of the valve piston 34. Even so, the outer circumference of the piston rings 66 and 68 still exhibit a positive clearance with the wall of the cylinder 14. With net positive clearance, the valve piston with the rings can move easily within the cylinder 14.

With the floating piston rings 66 and 68, it has been found that the piston 34 may be of a self lubricating polymeric material such as acetal polymer with PTFE filler. The rings 66 and 68 may be of the same material. The valve piston 34 continues to wear at what would be an unacceptable rate. However, the piston rings 66 and 68 are not forced against the wall of the cylinder 14 and exhibit far less wear than the valve piston 34. Consequently, the appropriate clearance between the piston rings 66 and 68 of the valve piston 34 can be maintained with the cylinder 14.

Accordingly, an improved actuator valve for an air driven reciprocating device is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An actuator valve for an air driven reciprocating device, comprising
   a valve piston including circumferential grooves adjacent the ends of the valve piston, respectively;
   a housing including a cylinder closed at each end and enclosing the valve piston, an inlet into the side of the cylinder and controlled passageways at the ends of the cylinder, respectively, there being clearance between the valve piston and the cylinder allowing air flow from the inlet to the closed ends of the cylinder;
   piston rings in each of the circumferential grooves, the piston rings fitting within the cylinder with a positive clearance and having a larger outer profile in the axial direction than the piston.

2. The actuator valve for an air driven reciprocating device of claim 1, the piston rings floating within the circumferential grooves.

3. The actuator valve for an air driven reciprocating device of claim 1, the piston rings, the piston and the cylinder being circular in cross section.

4. The actuator valve for an air driven reciprocating device of claim 1, the piston including radial holes extending into the piston at the inlet and passageways extending from the holes, respectively, to the ends of the piston, respectively, the holes being spaced apart axially of the piston a distance slightly greater than the width of the inlet at the cylinder in the axial direction of the cylinder.

5. An actuator valve for an air driven reciprocating device, comprising
   a valve piston including circumferential grooves adjacent the ends of the valve piston, respectively;
   a housing including a cylinder closed at each end and enclosing the valve piston, an inlet into the side of the cylinder and controlled passageways at the ends of the cylinder, respectively, there being clearance between the valve piston and the cylinder allowing air flow from the inlet to the closed ends of the cylinder;
   piston rings in each of the circumferential grooves, the piston rings floating within the circumferential grooves.

6. The actuator valve for an air driven reciprocating device of claim 5, the piston rings, the piston and the cylinder being circular in cross section.

7. The actuator valve for an air driven reciprocating device of claim 5, the piston rings fitting within the cylinder with a positive clearance.

8. An actuator valve for an air driven reciprocating device, comprising a valve piston including circumferential grooves adjacent the ends of the valve piston, respectively; the valve piston including radial holes extending into the piston at the inlet and passageways extending from the holes, respectively, to the ends of the piston, respectively, the holes being spaced apart axially of the piston a distance slightly grater than the width of the inlet at the cylinder in the axial direction of the cylinder;

a housing including a cylinder closed at each end and enclosing the valve piston, an inlet into the side of the cylinder and controlled passageways from the ends of the cylinder, respectively, there being clearance between the valve piston and the cylinder allowing air flow at the inlet to the closed ends of the cylinder;

piston rings in each of the circumferential grooves, the piston rings having the same but larger outer profile in the axial direction as the piston, the piston rings floating within the circumferential grooves, the piston rings fitting within the cylinder with a positive clearance.

9. The actuator valve for an air driven reciprocating device of claim 8, the piston rings, the piston and the cylinder being circular in cross section.

* * * * *